Figure 1:
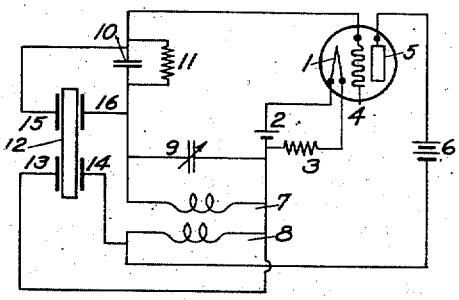

March 26, 1929. W. G. CADY Re. 17,245

METHOD OF MAINTAINING ELECTRIC CURRENTS OF CONSTANT FREQUENCY

Original Filed May 28, 1921

INVENTOR.
WALTER G. CADY
by David Rines
ATTORNEY.

Reissued Mar. 26, 1929. Re. 17,245

UNITED STATES PATENT OFFICE.

WALTER G. CADY, OF MIDDLETOWN, CONNECTICUT, ASSIGNOR TO RADIO CORPORATION OF AMERICA, A CORPORATION OF DELAWARE.

METHOD OF MAINTAINING ELECTRIC CURRENTS OF CONSTANT FREQUENCY.

Original No. 1,472,583, dated October 30, 1923, Serial No. 473,434, filed May 28, 1921. Application for reissue filed April 8, 1925. Serial No. 21,734.

DIVISION A.

The invention which forms the subject of my present application for Letters Patent is an improvement in the art of producing and maintaining alternating currents of constant frequency. It is well known that, heretofore, the development of such currents, to any very high degree of precision, has been unattainable by ordinary means and great difficulty has been experienced in producing alternating currents of high and constant frequency and free from fluctuations, due to disturbances in or near the generating system.

The useful applications of my invention are numerous. It may be employed in the transmission or the reception of intelligence by means of high-frequency currents, or it may be used for the testing and measurement of such currents, in all cases where the frequency can be varied, and, in general, the invention is applicable to currents of any frequency.

In an application filed by me on January 28, 1920, Serial No. 354,659, which has matured into Patent No. 1,450,246, April 3, 1923, I have shown and described what I have termed a piezo-electric resonator, which, in general, comprises a plate of piezo-electric crystal with coatings on its opposite faces. Such a device has a natural period of vibration, but when set in vibration by a source of alternating current connected to its coatings, the amplitude of such vibrations is very slight, unless the frequency of the alternating current approximates or equals the natural frequency of the device, in which case the reaction of the crystal upon the circuit may be very great. In carrying out my present invention, I utilize this piezo-electric resonator in the manner hereinafter to be described.

The special properties of the piezo-electric resonator that I take advantage of for my present purpose are—first: that property by virtue of which such a resonator, whose vibrations are maintained by impulses received from one electric circuit, may be used to transmit energy, in the form of an alternating current, into another circuit; second, that property which it possesses of modifying, by its reactions, the alternating current of a particular frequency or frequencies flowing to it; and third, the fact that the effective capacity of the resonator depends, in a manner which will more fully hereinafter appear, upon the frequency of the current in the circuit with which it may be connected.

In the description and explanations of my invention which follow, I have assumed the piezo-electric resonator to comprise a single, suitably prepared plate cut from a piezo-electric crystal, and provided with conductive coatings, and utilizing the so-called transverse effect; but all statements made apply equally to crystal preparations utilizing the longitudinal effect, and, in general, to any mechanical vibrating system whatever, having suitable preparations of piezo-electric crystals for setting the system into vibration and for utilizing its reactions.

The nature and purpose of the invention may be most readily comprehended by reference to the diagrams which I have used in its explanation and which are exhibited in the accompanying drawing.

Figure 2:
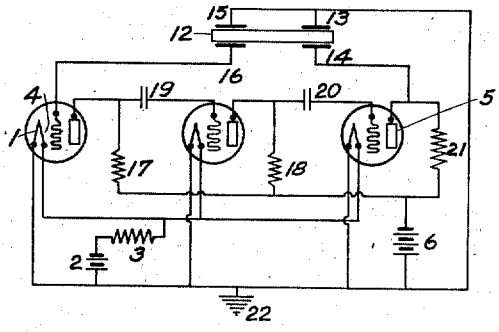
Figure 3:
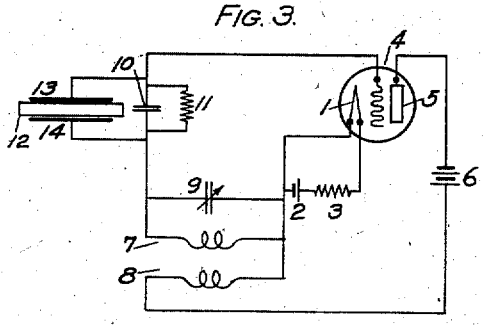
Figure 5:
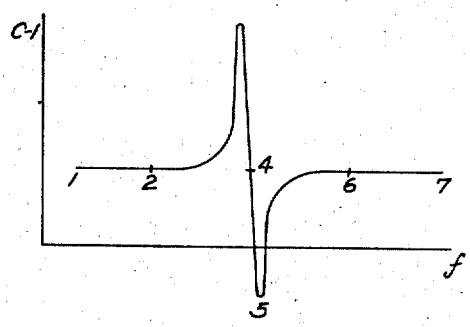
Figure 4:
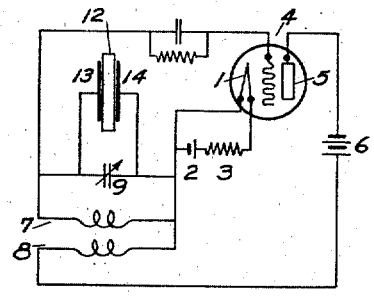
Figure 6:
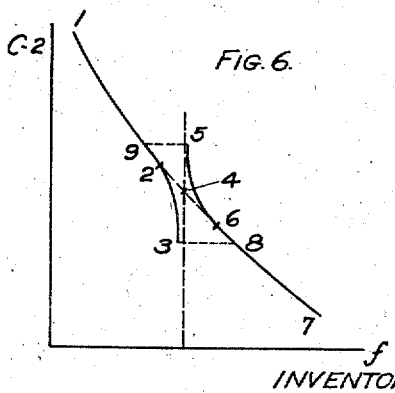

In this drawing:—Fig. 1 is a diagram of the well known and universally recognized Armstrong-oscillating circuit, selected for illustrative purposes and showing my invention applied thereto; Fig. 2 is a diagram of a three-stage amplification system of well-known type, with my invention applied thereto; Figs. 3 and 4 are other diagrams similar to Fig. 1 illustrating further modifications; and Figs. 5 and 6 are diagrams used in explaining the principles of the invention.

The above-described diagrams are illustrative examples of various ways in which a piezo-electric resonator may be employed to maintain constant frequency in an oscillatory electric circuit. It will be understood that they do not purport to show the only possible arrangements for securing this result, and, even as to those shown, it will be further understood that the illustrated arrangements may be modified in various ways which, however, are obvious to those skilled in the art and familiar with high-frequency apparatus and which will not alter the essential part played by the piezo-electric resonator.

I shall assume, for purposes of this case, that, in each case, the high-frequency oscillations are produced through the agency of the three-electrode vacuum tube of the type commonly used in radio-telegraphy, but I may state that this is not essential and that the only requirement is that the source of energy shall be capable of generating currents of a frequency determined or controlled by the electric constants of the oscillating circuit, and when I use the term "coatings", in referring to the resonator, I mean either thin layers of metal on the crystal itself, or metallic plates in fixed relation to the crystal, or, in general, any means whereby an electric charge may be conducted to the resonator in such a way as to produce an electric field in the proper direction through the crystal.

In order to make the mechanical vibrations as little damped as possible, I have departed from the practice of previous experimenters, of cementing tinfoil coatings directly on to the piezo-electric plate, and have placed the plate, entirely uncoated, between two or more plates of metal which are connected to the electric circuit and serve as the "coatings". A small air space is left between the plate and the coatings. The crystal is free to vibrate in the space between the coatings.

With the above understanding, I now refer to Fig. 1. In this figure, the numeral 1 represents the filament of the vacuum tube, 2 is the filament battery, 3 a regulating resistance, 4 the grid and 5 the anode of the vacuum tube. The battery in the anode circuit is designated by 6. These are the main, essential parts of one of the numerous types of circuit commonly used for the generation of high-frequency oscillations, the other elements being the coils 7 and 8 in the grid and anode circuits, respectively, 9 a variable condenser in parallel with the coil 7, for the purpose of controlling the frequency of the oscillations, 10 the grid condenser, and 11 the leak. All these are old and well known.

The plate or crystal of the piezo-electric resonator is indicated by 12 and this plate has four coatings 13, 14, 15 and 16, the two former being connected to the terminals of the coil 8, the two latter to the grid circuit, around the condenser 10.

The operation of the system is as follows: When the coupling between the two coils 7 and 8 is of proper character or value, the circuit oscillates with a frequency determined, in the main, by the capacity of condenser 9, and the self-inductance of the coil 7. If the capacity of condenser 9 be varied, the frequency changes, and when a rate is reached corresponding to one of the natural modes of vibration of the piezo-electric resonator, the latter begins to vibrate, by reason of the electric field existing between the coatings 13 and 14. These vibrations, through the piezo-electric action, cause electric charges to be induced on the coatings 15 and 16, which, in turn, alter the potential difference across the condenser 10, and hence the potential of the grid itself.

Whether the amplitude of the potential of the grid be thereby increased or diminished depends upon which of the coatings 15 or 16 is connected to the grid, and upon the phase relations in the electric circuits and in the piezo-electric resonator itself.

The phase of the vibration of the resonator is modified by the fact that the potential difference between the coatings 15 and 16 is influenced by the periodic voltage already existing across the condenser 10. In order to effect the maximum reinforcement of the oscillations, it may be advisable to control the phase of the vibrations of the resonator. This may be done, for example, by giving the coil 8 a certain resistance, or by inserting, in series with the coil 8, another inductance and a resistance and connecting the coatings 13 and 14 in parallel with such inductance and resistance, instead of in parallel with the coil 8.

The frequency of the electric oscillations as determined by the inductance of coil 7 and the capacity of the condenser 9, may be that of the fundamental vibration of the piezo-electric resonator, or of one of its overtones. In any case, the two pairs of coatings on the resonator should have such a size and position, relatively to the ends of the crystal plate, as to cause the greatest possible amplitude of vibration at the desired frequency. To excite this greatest amplitude, the coatings should be placed opposite the regions where the stresses in the plates are greatest when vibrating. For the fundamental, for example, this is near the center of the plate. For the first overtone, which is twice the fundamental frequency, the plate vibrates in halves, with a node of pressure at the center; the pairs of coatings should therefore be positioned at points a quarter of the distance from each end of the plate. Either the fundamental or the first overtone may be obtained. And so for other overtones. It is also of great importance that the coatings be so disposed, and the plate so supported that the vibrations shall be damped as little as possible.

If, under the conditions assumed, while the oscillations are being reinforced, through the vibrations of the piezo-electric resonator, and at any of the frequencies mentioned above, the coupling between coils 7 and 8 be loosened to such a degree that the circuit, with the resonator absent, would just fail to oscillate, with the resonator present it will be found that the oscillations still persist; and, moreover, that a variation in the capacity of the condenser 9 over a certain range has no appreciable effect upon the frequency in the circuit. In other words, this frequency is determined solely by the period of vibrations of the resonator itself. It is, as a matter of fact, often an advantage to make the capacity of condenser 10 very small, or even to omit it altogether.

I have found that all of those factors that usually have a disturbing effect upon the frequency, as, for example, variations in the voltage of either of the batteries 2 or 6, or movements of the hand near the circuit, are, by the use of the piezo-electric resonator, and within wide limits, without appreciable effect upon the frequency.

The piezo-electric resonator may be used in connection with other types of oscillating circuit than the one above described. In accordance with the principle of operation set forth above, it may be used with any generator of alternating current, the frequency of which is capable of being determined by the varying potential difference between two fixed points in the circuit or system of circuits.

The greater the amplification constant of the vacuum tube, the more widely may the electrical constants of the circuit be altered, without affecting the frequency. For this reason, a still greater degree of stability may be attained by the use of a plurality of tubes, connected for cascade amplification. I have found, for instance, that by the use of a cascade amplifier comprising three tubes, the coils 7 and 8 and the condenser 9 may be entirely dispensed with.

This arrangement of circuits is shown in Fig. 2, in which 4 represents the grid of the first tube and 5 the anode of the third. Two resistances 17 and 18 are employed, and two condensers 19 and 20. This illustrates the well known "resistance amplification," but any other type of amplifier might be employed. In this figure, 21 is a resistance or other impedance in the anode or output circuit, while the piezo-electric resonator 12 has its two coatings 13 and 14 connected to the plate 5, and the ground 22, respectively, and its two coatings 15 and 16 connected, the one to the ground 22, and the other to the grid 4.

The operation of this arrangement is as follows: Any slight increase in the potential of the anode 5, by altering the electric field between the plates 13 and 14, sets the piezo-electric resonator in vibration. The charges thereby excited in the coatings 15 and 16 vary the potential of the grid 4 with respect to the ground 22. This varying potential, by virtue of the amplification taking place in the system, will, if the proper coating is connected with the grid 4, still further increase the variations in the potential of the anode 5 and maintain the piezo-electric resonator in vibration. From the terminals of the resistance or impedance 21, a small amount of output power, at a constant frequency, may be drawn.

It is possible to secure constant frequency through the agency of a piezo-electric resonator which has only a single pair of plates or coatings, and this may be accomplished, in various ways, by taking advantage of one or the other of the electrical effects produced by the resonator when approximating one of its resonating frequencies. For instance, this result may be effected as shown in Fig. 3, which is exactly like the arrangement shown in Fig. 1, except that the piezo-electric resonator 12 has but one pair of coatings 13 and 14, which are connected in parallel with the condenser 10. If the capacity of the resonator be sufficiently large, the condenser may even be dispensed with.

In explanation of the action which takes place in this case, let it be assumed that the coupling between the coils 7 and 8 be loosened, as by increasing the distance between the two, until the circuit just fails, in the absence of the piezo-electric resonator 12, to oscillate. When the resonator is present, however, and the capacity of the condenser 9 is not too far from the value which would, with closer coupling, make the circuit oscillate at the same frequency as that of the vibrations of the resonator, the circuit will be found to be oscillating. The oscillations, in this case, are due to the vibration of the resonator 12 and are of a frequency that is stable against disturbing influences, provided those latter be not too pronounced.

The theory of this regenerative action may be stated as follows: Suppose that, owing to some slight mechanical jar or electrical disturbance, the resonator is set into feeble vibrations. Through the piezo-electric action, these vibrations cause corresponding changes in the potential of grid 4, Fig. 3, which, in turn,—owing to the amplifying action of the vacuum tube and its associated circuits,—cause similar pulsating currents in the coil 7. These pulsating currents influence the charges on the coatings of the resonator and tend to maintain the vibrations of the latter. Since the resonator is supposed to have been set into vibration by a somewhat sudden disturbance, it follows, in accordance with well known principles, that its vibrations, and consequently the effect which it produces, as indicated above, in the coil 7, do not possess simply a single frequency, but may be considered as a combination of many frequencies of slightly different values. Of these different frequencies, that one predominates which is associated with maximum fluctuations of grid potential. I have shown, theoretically (Proceedings, Institute of Radio Engineers, vol. 10, p. 83, April, 1922), and verified by special experiments, that for the alternating electromotive force acting in the circuit, the current flowing to the resonator is greatest at a frequency very slightly below the natural frequency of said resonator. Also, when the resonator current is greatest, the consequent fluctuations in grid potential are naturally greatest. Hence, with the circuit shown in Fig. 3, an alternating current of practically unvarying frequency will be built up and maintained in the system, of a frequency slightly lower than the natural frequency of vibration of the resonator.

The following example illustrates the applicability of the piezo-electric resonator to the stabilization of the frequency when connected across the tuning condenser of the vacuum-tube, oscillating circuit. Now to understand this action, the theory in the piezo-electric resonator must be considered and borne in mind.

In my former patent, above referred to, I have shown that the apparent capacity of the piezo-electric reconator undergoes certain changes in the neighborhood of resonance, and these changes are of fundamental importance in the example now to be considered.

Let it be assumed, in illustration, that the resonator is connected to a high-frequency, sinusoidal electro-motive force of constant voltage. When the frequency is considerably below that at which the resonator vibrates, the latter behaves like a simple condenser, having a certain capacity, which may be termed its "normal" capacity. As the frequency is raised to a value at which the piezo-electric resonator begins to vibrate perceptably, the elongation of the resonator plate is at first nearly in phase with the mechanical stress, which, in turn, is always exactly in phase with the voltage across the resonator. Hence, in accordance with the well known laws of piezo-electricity, the piezo-electric polarization resulting from the elongation is nearly in phase with the impressed voltage, thus causing the total dielectric displacement in the piezo-electric resonator to be greater than normal.

Since the apparent or, as it may be termed, the equivalent, capacity of the resonator is, other things being equal, proportional to the total dielectric displacement, it follows that so long ts the frequency is below the resonant value, the apparent capacity is abnormally large. It may, in fact, be many times in excess of the normal value. But after passing through a maximum, the apparent capacity decreases, and close to the resonant frequency, it returns to its normal value. Upon a further increase in frequency, the apparent capacity becomes abnormally small, in some cases even attaining a considerable negative value. If the frequency continues to increase, a minimum in the apparent capacity is reached, after which it gradually returns to its normal value. These effects are due to the change in phase of elongation with respect to the driving force which the vibrating resonator, in common with all systems undergoing forced vibrations, experiences in the neighborhood of resonance.

I have represented these changes in the diagram of Fig. 5, in which the apparent capacity of the piezo-electric resonator, which may be denoted by $C^1$, is plotted as a function of the frequency $f$. Starting at a low value of frequency, the apparent capacity has its normal value, represented by the point indicated by 1. As the frequency $f$ increases, the apparent capacity $C^1$ remains approximately constant until, at a frequency corresponding to the point 2, the resonator begins to vibrate perceptibly, and the curve begins to rise. The points 3, 4, 5, 6 and 7 are reached, in succession, in accordance with the theory stated.

Assume now, therefore, that the piezo-electric resonator be connected in parallel with the tuning condenser 9 as shown in Fig. 4. The diagram of this figure represents a vacuum-tube circuit, oscillating in the same manner as that shown in Fig. 1, through the mutual induction of the coils 7 and 8, the frequency being determined by the variable condenser 9. The coatings 13 and 14 of the resonator 12 are in parallel with the condenser 9.

Let the capacity of the condenser 9 be denoted by $C^2$. If the capacity $C^1$ were constant, then a decrease in capacity $C^2$ would result in a continuous increase in the frequency $f$, as indicated in Fig. 6, by the curve 1, 9, 2, 4, 6, 8 and 7. Suppose, however, and observing that the corresponding points in Figs. 5 and 6 are similarly numbered, that the piezo-electric resonator begins to vibrate perceptibly at a frequency corresponding to the point 2, thereupon the capacity $C^1$ begins to be abnormally large and therefore tends to diminish the frequency, with the result that the frequency increases less than it otherwise would. Continued decrease of the capacity $C^2$ causes capacity $C^1$ to increase still further, so that the curve bends down along the portions 2, 3. At point 3, the apparent capacity $C^1$ has reached its greatest possible value, and if $C^2$ be further decreased the resonator plate suddenly ceases to vibrate, or, at best, it vibrates feebly, at a much higher frequency, namely, the frequency corresponding to the point 8. In other words, the curve springs abruptly from the point 3 to the point 8. From this on, any further decrease in $C^2$ gives rise merely to the undisturbed portion 8, 7 of the curve. If, on the other hand, the capacity $C^2$ be increased, beginning at the point 7, the path 7, 8, 6, 5, 9, 1 will be traced, for reasons strictly analogous to those given for the curve described on decreasing the capacity $C^2$, as stated above.

The less damped the vibrations of the piezo-electric resonator, the more nearly constant will be the frequency over the portions of the curve 2, 3 and 5, 6 in Fig. 6. Hence, it is manifest that a resonator made from materials of good mechanical properties, such as quartz, or a combination of quartz and steel, suitably prepared and mounted, as has been set forth in my prior patent, will exert a marked stabiling effect upon the frequency of the generating circuit with which it is connected. Any disturbing agent, as, for example, small changes in the value of $C^2$, or in other capacities in the circuit, or variations in the filament current, will have almost no effect at all upon the frequency, so long as such disturbing agent is not so pronounced as to cause the operating point on the curve to fall outside of the ranges 2, 3 and 5, 6.

Having now described my invention what I claim is:

1. The combination with a generating system of alternating current the frequency of which is capable of being determined by the varying potential difference between two fixed points therein, of a piezo-electric resonator having two pairs of coatings, one pair being so connected to the alternating current system that the said resonator is maintained in a state of vibration, while the other pair is connected to the said two fixed points so as to cause the generator to produce alternating current of a frequency identical with that of the mechanical vibrations of the said resonator.

2. The combination with an alternating current amplifier of a piezo-electric resonator having two pairs of conducting coatings, one pair connected to the output circuit of the amplifier, the other pair connected to the input circuit so as to cause in the output circuit an alternating current to flow the frequency of which is determined by the mechanical vibrations of the said resonator.

3. An oscillating system comprising two circuits and means for transferring energy from one of the circuits to the other circuit and a piezo-electric body connected with the system to feed back from the said other circuit to the said one circuit, the piezo-electric body being designed to maintain the frequency of the oscillations substantially constant.

4. An oscillating system comprising an output circuit, an input circuit having a condenser, and a piezo-electric body having a plurality of coatings connected around the condenser and with the output circuit, the body being designed to maintain the frequency of the oscillations substantially constant.

5. An alternating-current system the frequency of which is capable of being determined by the varying potential difference between two points thereof, the said system comprising a piezo-electric body having two pairs of coatings, the body being so designed and one of the pairs of coatings being so connected to the system that the body shall be maintained in a state of vibration, and the other pair of coatings being connected with the said two points, whereby the frequency of the oscillations will be maintained substantially constant.

6. An alternating-current system comprising an input circuit, an output circuit and a piezo-electric body having two pairs of coatings, one of the pairs of coatings being connected with the output circuit, and the other pair of coatings being connected with the input circuit, the body being so designed and connected that the frequency of the oscillations in the output circuit shall be substantially constant.

7. In an alternating-current system, a plurality of coatings connected with the system, and a piezo-electric body freely disposed between the coatings, the body being so designed that its natural frequency of mechanical vibrations shall be in substantial resonance with a predetermined frequency of the current, whereby the body will react electrically upon the current at substantially the predetermined frequency.

8. In combination, a piezo-electric body and a plurality of coatings between which the body is freely disposed.

9. In an alternating-current system, a plurality of coatings connected with the system, and an electro-mechanical vibrator freely disposed between the coatings, the vibrator being adapted to vibrate mechanically when stimulated electrically and to respond electrically when vibrated mechanically.

In testimony whereof, I hereunto affix my signature.

WALTER G. CADY.